United States Patent
Mutoh et al.

(10) Patent No.: US 9,583,760 B2
(45) Date of Patent: Feb. 28, 2017

(54) METHOD FOR PRODUCING NEGATIVE ELECTRODE MATERIAL FOR LITHIUM ION BATTERIES

(71) Applicants: SHOWA DENKO K.K., Tokyo (JP); UMICORE, Brussels (BE)

(72) Inventors: Arihiro Mutoh, Tokyo (JP); Yoshiaki Ikenoue, Tokyo (JP); Masashi Sakaguchi, Tokyo (JP); Hirokazu Murata, Tokyo (JP); Masataka Takeuchi, Tokyo (JP); Nobuaki Ishii, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 25 days.

(21) Appl. No.: 14/646,247

(22) PCT Filed: Nov. 21, 2013

(86) PCT No.: PCT/JP2013/006851
§ 371 (c)(1),
(2) Date: May 20, 2015

(87) PCT Pub. No.: WO2014/080632
PCT Pub. Date: May 30, 2014

(65) Prior Publication Data
US 2015/0295233 A1    Oct. 15, 2015

(30) Foreign Application Priority Data
Nov. 21, 2012    (JP) .................................. 2012-255743

(51) Int. Cl.
*H01M 4/1393*    (2010.01)
*H01M 4/1395*    (2010.01)
(Continued)

(52) U.S. Cl.
CPC ............. *H01M 4/366* (2013.01); *C01B 31/02* (2013.01); *C01B 31/04* (2013.01);
(Continued)

(58) Field of Classification Search
CPC .. H01M 4/366; H01M 4/0402; H01M 4/0471; H01M 4/133; H01M 4/134;
(Continued)

(56) References Cited

U.S. PATENT DOCUMENTS 6,589,696 B2 *  7/2003  Matsubara ............... H01M 2/32
                                                        429/218.1
6,733,922 B2 *  5/2004  Matsubara ............ H01M 4/362
                                                        252/182.1
(Continued)

FOREIGN PATENT DOCUMENTS

JP    2002-8652 A    1/2002
JP    2002-75350 A   3/2002
(Continued)

OTHER PUBLICATIONS

International Search Report for PCT/JP2013/006851 dated Jan. 7, 2014.
(Continued)

*Primary Examiner* — Gregg Cantelmo
(74) *Attorney, Agent, or Firm* — Sughrue Mion, PLLC (57) ABSTRACT

A negative electrode material for lithium ion batteries is obtained by a method which includes: mixing carbon particles (B) such as graphite particles, particles (A), such as Si particles, containing an element capable of occluding and releasing lithium ions, a carbon precursor such as sucrose, a carboxylic acid compound such as acetic acid, and a liquid medium such as water or isopropyl alcohol to prepare a slurry; drying and solidifying the slurry; and heat-treating the resulting solidified material to carbonize the carbon (Continued)

precursor. A lithium ion battery is obtained using this negative electrode material.

14 Claims, 1 Drawing Sheet

(51) Int. Cl.
*H01M 4/36* (2006.01)
*H01M 4/587* (2010.01)
*H01M 4/133* (2010.01)
*H01M 4/134* (2010.01)
*H01M 4/04* (2006.01)
*H01M 10/0525* (2010.01)
*C01B 31/02* (2006.01)
*C01B 31/04* (2006.01)
*H01M 4/02* (2006.01)

(52) U.S. Cl.
CPC ....... *H01M 4/0402* (2013.01); *H01M 4/0471* (2013.01); *H01M 4/133* (2013.01); *H01M 4/134* (2013.01); *H01M 4/1393* (2013.01); *H01M 4/1395* (2013.01); *H01M 4/36* (2013.01); *H01M 4/587* (2013.01); *H01M 10/0525* (2013.01); *H01M 4/362* (2013.01); *H01M 2004/027* (2013.01); *Y02E 60/122* (2013.01); *Y02P 70/54* (2015.11)

(58) Field of Classification Search
CPC .... H01M 4/1393; H01M 4/1395; H01M 4/36; H01M 4/587; H01M 4/362; H01M 10/0525; H01M 2004/027; C01B 31/02; C01B 31/04; Y02P 70/54; Y02E 60/122
See application file for complete search history.

(56) References Cited

U.S. PATENT DOCUMENTS

| | | | |
|---|---|---|---|
| 7,618,678 B2* | 11/2009 | Mao | C25D 17/10 427/212 |
| 2002/0009646 A1 | 1/2002 | Matsubara et al. | |
| 2004/0124402 A1 | 7/2004 | Nanba et al. | |
| 2008/0145757 A1 | 6/2008 | Mah et al. | |
| 2012/0196193 A1 | 8/2012 | Sotowa et al. | |

FOREIGN PATENT DOCUMENTS

| | | |
|---|---|---|
| JP | 2004-63411 A | 2/2004 |
| JP | 2004-178922 A | 6/2004 |
| JP | 2004-182512 A | 7/2004 |
| JP | 2004-207017 A | 7/2004 |
| JP | 2004-362789 A | 12/2004 |
| JP | 2007-165061 A | 6/2007 |
| JP | 2013-254728 A | 12/2013 |

OTHER PUBLICATIONS

Supplementary European Search Report dated Mar. 10, 2016 from the European Patent Office issued in corresponding Application No. 13856536.
Ilias Belharouak et al., "Structural and Electrochemical Characterization of $Li_2MnSiO_4$ Cathode Material", Journal of Physical Chemistry C, vol. 113, No. 48, 2009, pp. 20733-20737.

* cited by examiner

METHOD FOR PRODUCING NEGATIVE ELECTRODE MATERIAL FOR LITHIUM ION BATTERIES

CROSS REFERENCE TO RELATED APPLICATIONS

This application is a National Stage of International Application No. PCT/JP2013/006851 filed Nov. 21, 2013, claiming priority based on Japanese Patent Application No. 2012-255743, filed Nov. 21, 2012, the contents of all of which are incorporated herein by reference in their entirety.

TECHNICAL FIELD

The present invention relates to a method for producing a negative electrode material for lithium ion batteries. More specifically, the present invention relates to a method for producing a negative electrode material with which a lithium ion battery having a large charge and discharge capacity and superior charge and discharge cycle characteristics can be obtained.

BACKGROUND ART

As the trend of portable electronics toward multifunctionality has been outpacing the trend toward reduction in power requirements for electronic components, power consumption of portable electronics has been on the rise. Because of this, lithium-ion batteries, which are the primary power sources in portable electronics, are in demand more strongly than ever to have larger capacities and be smaller in size. In addition, with the growing demand for electric vehicles, lithium-ion batteries for use in such vehicles are strongly demanded to have larger capacities.

Graphite is mainly used as a negative electrode material for the conventional lithium ion batteries. Graphite can occlude Li only up to the stoichiometric ratio of $LiC_6$. Therefore, the theoretical capacity of a lithium ion battery in which graphite is used as a negative electrode is 372 mAh/g.

In order to achieve a high capacity of a lithium ion battery, particles comprising a metal element, such as Si, Sn or the like, having a large theoretical capacity are considered to use for a negative electrode material. For example, the theoretical capacity of a lithium ion battery in which Si-containing particles are used for a negative electrode material is 4200 mAh/g. In contrast, the theoretical capacity of a lithium battery in which metal lithium is used is 3900 mAh/g. Therefore, if Si and the like can be used for a negative electrode material, a lithium ion battery which is smaller and of a higher capacity than a lithium battery is expected to be obtained. However, a negative electrode material such as Si or the like has a large expansion and contraction associated with intercalation and deintercalation (occlusion and release) of lithium ions. This may result in gaps between particles, and a capacity as good as expected can not be obtained. Further, since particles crack into fine powders due to repeated large expansion and contraction, electric contacts may break to increase internal resistance. Therefore, the resulting lithium ion battery may have a short charge and discharge cycle life.

Accordingly, the followings have been proposed such as a negative electrode material comprising Si and/or Sn-containing particles and fibrous carbon (Patent Document 1); a negative electrode material comprising a graphite particle and a carbonaceous material attached to the surface of the graphite particle, the carbonaceous material containing a Si-containing particle and fibrous carbon (Patent Document 2); a negative electrode material comprising a mixture of metal-based particles such as Si, Sn, Ge or the like and graphite particles in which $d_{002}$ is not less than 0.3354 nm and not more than 0.338 nm and the area ratio of the G peak and the D peak by the Raman spectroscopy is G/D≥9 (Patent Document 3); a negative electrode material comprising a solid solution comprising an element such as Si, Ge or the like capable of occluding and releasing lithium ions and an element such as Cu or the like incapable of occluding and releasing lithium ions (Patent Document 4); a negative electrode material in which Si particles are attached to the surface of a graphite particle, and a carbon coating is covered on at least a portion of the surface of the graphite particle (Patent Document 5); an electrode structure in which a metal powder and a supporting powder are compounded with a binding material serving to form chemical bonds (Patent Document 6).

CITATION LIST

Patent Literatures

Patent Document 1: JP 2004-178922 A
Patent Document 2: JP 2004-182512 A
Patent Document 3: JP 2004-362789 A
Patent Document 4: JP 2002-075350 A
Patent Document 5: JP 2002-008652 A
Patent Document 6: JP 2007-165061 A

SUMMARY OF THE INVENTION

Problems to be Resolved by the Invention

An object of the present invention is to provide a negative electrode material with which a lithium ion battery having a large charge and discharge capacity and superior charge and discharge cycle characteristics can be obtained.

Means for Solving the Problems

After conducting extensive studies to achieve the above object, the present inventors have completed an invention including the following aspects.
[1] A method for producing a negative electrode material for lithium ion batteries, the method comprising:
mixing carbon particles (B), particles (A) comprising an element capable of occluding and releasing lithium ions, a carbon precursor, a carboxylic acid compound and a liquid medium to prepare a slurry;
drying and solidifying the slurry; and
heat-treating the resulting solidified material to carbonize the carbon precursor.
[2] The method for producing a negative electrode material for lithium ion batteries according to the item [1], wherein the liquid medium is a polar solvent.
[3] The method for producing a negative electrode material for lithium ion batteries according to the item [1] or [2], wherein the carboxylic acid compound is at least one selected from the group consisting of aliphatic carboxylic acid, aromatic carboxylic acid, hydroxycarboxylic acid, oxocarboxylic acid, polyvalent carboxylic acid, carboxylic acid anhydride and carboxylate.
[4] The method for producing a negative electrode material for lithium ion batteries according to any one of the items [1] to [3], wherein the carboxylic acid compound is at least one selected from the group consisting of formic acid, acetic acid, propionic acid, butyric acid, valeric acid and caproic acid.

[5] The method for producing a negative electrode material for lithium ion batteries according to any one of the items [1] to [4], wherein a temperature during the heat treatment is not less than 200° C. and not more than 2000° C.

[6] The method for producing a negative electrode material for lithium ion batteries according to any one of the items [1] to [5], wherein the carbon precursor is a saccharide.

[7] The method for producing a negative electrode material for lithium ion batteries according to any one of the items [1] to [5], wherein the carbon precursor is at least one selected from the group consisting of glucose, fructose, galactose, sucrose, maltose, lactose, starch, cellulose and glycogen.

[8] The method for producing a negative electrode material for lithium ion batteries according to any one of the items [1] to [7], wherein the amount of the particles (A) is 1 to 100 parts by mass relative to 100 parts by mass of the carbon particles (B).

[9] The method for producing a negative electrode material for lithium ion batteries according to any one of the items [1] to [8], wherein the element capable of occluding and releasing lithium ions is at least one selected from the group consisting of Si, Sn, Ge, Al and In.

[10] The method for producing a negative electrode material for lithium ion batteries according to any one of the items [1] to [9], wherein the amount of the carbon precursor is 0.05 to 50 parts by mass relative to total 100 parts by mass of the particles (A) and the carbon particles (B).

[11] The method for producing a negative electrode material for lithium ion batteries according to any one of the items [1] to [10], wherein the carbon particles (B) are graphite particles prepared by heat-treating a petroleum-derived coke and/or a coal-derived coke at a temperature of 2000° C. or more.

[12] The method for producing a negative electrode material for lithium ion batteries according to any one of the items [1] to [11], wherein the carbon particles (B) are carbonaceous particles prepared by heat-treating a petroleum-derived coke and/or a coal-derived coke at a temperature of not less than 800° C. and less than 2000° C.

[13] The method for producing a negative electrode material for lithium ion batteries according to any one of the items [1] to [12], wherein the carbon particles (B) comprise graphite particles prepared by heat-treating a petroleum-derived coke and/or a coal-derived coke at a temperature of 2000° C. or more; and carbonaceous layers being 0.1 or more in the ratio $I_D/I_G$ (R value) of the intensity ($I_D$) of a peak present in a range between 1300 and 1400 $cm^{-1}$ and the intensity ($I_G$) of a peak present in a range between 1580 and 1620 $cm^{-1}$ as measured by Raman spectroscopy wherein the carbonaceous layers are on the surface of the graphite particles.

[14] The method for producing a negative electrode material for lithium ion batteries according to the item [13], wherein the amount of the carbonaceous layers is 0.05 to 10 parts by mass relative to 100 parts by mass of the graphite particles.

[15] A negative electrode material for lithium ion batteries obtainable by the method according to any one of the items [1] to [14], the negative electrode material comprising:
the carbon particles (B),
carbon layers covering the surfaces of the carbon particles (B) and
the particles (A) comprising an element capable of occluding and releasing lithium ions, the particles (A) being surrounded by the carbon layers.

[16] A negative electrode sheet, comprising:
a current collector and
a layer comprising the negative electrode material according to the item [15], a binder and an electrically conductive assistant, the current collector being coated with the layer.

[17] A lithium ion battery comprising the negative electrode sheet according to the item [16].

Advantageous Effects of the Invention

By using the negative electrode material obtained by the manufacturing method according to the present invention, a lithium ion battery having a large charge and discharge capacity and superior charge and discharge cycle characteristics can be manufactured.

EMBODIMENT FOR CARRYING OUT THE INVENTION

The method for producing a negative electrode material for lithium ion batteries according to one embodiment of the present invention comprises:
mixing the carbon particles (B), the particles (A) comprising an element capable of occluding and releasing lithium ions, a carbon precursor, carboxylic acid compound and a liquid medium to prepare a slurry;
drying and solidifying the slurry; and
heat-treating the resulting solidified material to carbonize the carbon precursor.

(Particles (A) Comprising an Element Capable of Occluding and Releasing Lithium Ions)

The particles (A) used in the method for producing a negative electrode material according to one embodiment of the present invention comprise a material containing an element capable of occluding and releasing lithium ions. As a matter of course, the particles (A) refer to those other than the carbon particle (B) described below. There is no particular limitation for the element to be contained in the particles (A) as long as it is capable of occluding and releasing lithium ions. As preferred elements, mentioned is Si, Sn, Ge, Al or In. Si is preferred in view of thermal resistance. The particles (A) may comprise one of the above elements alone or a compound, mixture, eutectic material or solid solution containing at least one of the above elements. Further, the particles (A) may be those in which two or more particulates aggregate. As forms of the particles (A), mentioned is a massive form, a scale-like form, a spherical form, a fibrous form or the like. Among these, a spherical form or a massive form is preferred. The particles (A) may form a secondary particle.

As materials containing an Si element, mentioned are those represented by the general formula: $M^{\alpha}_m Si$. The above material is a compound, a mixture, an eutectic material or a solid solution containing an element $M^{\alpha}$ in a ratio of m mol relative to 1 mol of Si.

$M^{\alpha}$ is an element other than Li. Specifically, examples of $M^{\alpha}$ include Si, B, C, N, O, S, P, Na, Mg, Al, K, Ca, Ti, V, Cr, Mn, Fe, Co, Ni, Cu, Zn, Mo, Ru, Rh, Pd, Pt, Be, Nb, Nd, Ce, W, Ta, Ag, Au, Cd, Ga, In, Sb, Ba or the like. Note that in a case where $M^a$ is Si, the material means Si elementary substance. In the formula, m is preferably 0.01 or more, more preferably 0.1 or more, even more preferably 0.3 or more.

Specific examples of the material containing an Si element include Si elementary substance, alloys of Si and an alkaline earth metal; alloys of Si and a transition metal; alloys of Si and a metalloid; solid solution alloys or eutectic alloys of Si and Be, Ag, Al, Au, Cd, Ga, In, Sb or Zn; silicides such as CaSi, $CaSi_2$, $Mg_2Si$, $BaSi_2$, $Cu_5Si$, FeSi, $FeSi_2$, $CoSi_2$, $Ni_2Si$, $NiSi_2$, MnSi, $MnSi_2$, $MoSi_2$, $CrSi_2$, $Cr_3Si$, $TiSi_2$, $Ti_5Si_3$, $NbSi_2$, $NdSi_2$, $CeSi_2$, $WSi_2$, $W_5Si_3$, $TaSi_2$, $Ta_5Si_3$, PtSi, $V_3Si$, $VSi_2$, PdSi, RuSi, RhSi or the like; $SiO_2$, SiC, $Si_3N_4$ or the like.

As materials containing an Sn element, mentioned are tin elemental substance, tin alloys, tin oxides, tin sulfides, tin halides, stannides and the like. Specific examples of the material containing an Sn element include alloys of Sn and Zn, alloys of Sn and Cd, alloys of Sn and In, alloys of Sn and Pb; tin oxides such as SnO, $SnO_2$, $M^b{}_4SnO_4$ ($M^b$ represents a metal element other than Sn) or the like; tin sulfides such as SnS, $SnS_2$, $M^b{}_2SnS_3$ or the like; tin halides such as $SnX_2$, $SnX_4$, $MbSnX_4$ ($M^b$ represents a metal element other than Sn. X represents a halogen atom) or the like; stannides such as MgSn, $Mg_2Sn$, FeSn, $FeSn_2$, MoSn, $MoSn_2$ or the like.

The particles (A) are preferably oxidized at the surfaces thereof. This oxidation may be due to natural oxidation or artificial oxidation. The particles (A) is covered with thin oxide coatings by this oxidation.

The particles (A) in a state of a raw material have a number average particle diameter of primary particles of preferably 10 nm to 1 μm, more preferably 30 nm to 500 nm. The particles (A) in a state of a raw material usually form aggregates (secondary particles), and may show a peak in each of a range of 0.1 μm to 1 μm and a range of 10 μm to 100 μm in the particle size distribution of the aggregates (secondary particles). Further, the 50% particle diameter (D50) of the particles (A) in a state of a raw material is preferably 1/200 to 1/10, more preferably 1/100 to 1/20 relative to the 50% particle diameter of the carbon particles (B) in a state of a raw material.

In the present invention, aggregates are disassembled and the amount of primary particles increases in the particles (A) in a state where they are attached to the carbon particles (B), and the number average particle diameter of the particles (A) in a state where they are attached to the carbon particles (B) is preferably 0.001 to 10 μm, more preferably 0.01 to 5 μm, even more preferably 0.05 to 1 μm. In the conventional technology, the particles (A) in a state where they are attached to the carbon particles (B) readily agglomerate, and the number average particle diameter is often more than 10 μm due to secondary particles (aggregates) with larger diameters. Note that the distribution state of the particles (A) in a state where they are connected to the carbon particles (B) can be determined based on a scanning electron microscopical image.

The amount of the particles (A) is preferably 1 to 100 parts by mass, more preferably 3 to 50 parts by mass, even more preferably 5 to 30 parts by mass relative to 100 parts by mass of the carbon particles (B).

(Carbon Particles (B))

The carbon particles (B) used in the method for producing a negative electrode material according to one embodiment of the present invention are those comprising a carbon material. As a carbon material, used are a graphite material such as an artificial graphite, a pyrolytic graphite, an expanded graphite, a natural graphite, a squamous graphite, a scale-like graphite or the like; or a poorly crystalline carbonaceous material such as a graphitizable carbon, a non-graphitizable carbon, a glassy carbon, an amorphous carbon and a low-temperature calcined carbon or the like. Among these, the followings are preferred for the carbon particles (B): those comprising a graphite material, those comprising graphite particles and carbonaceous layers, those comprising carbon coated graphite particles to which carbon fibers are bound, and those comprising a poorly crystalline carbonaceous material.

The carbon particles (B) have a 50% particle diameter ($D_{50}$) in a volumetric cumulative particle size distribution of preferably 2 to 40 μm, more preferably 2 to 30 μm, even more preferably 3 to 20 μm.

As for the carbon particle (B), when fine particles are high in number, it is difficult to raise the electrode density, while when large particles are high in number, application of the negative electrode layer can be non-uniform to potentially impair battery properties. As understood from the above, the carbon particles (B) preferably has a particle size distribution that 90% or more of the particles in number have a particle diameter within the range of 1 to 50 μm and more preferably has such a particle size distribution that 90% or more of the particles in number have a particle diameter within the range of 5 to 50 μm. Further, the carbon particles (B) have a 10% particle diameter ($D_{10}$) in a volumetric cumulative particle size distribution of preferably 1 μm or more, more preferably 2 μm or more. Note that the particle size distribution of the carbon particles (B) is to be measured with a laser diffraction particle size distribution measurement analyzer. The measured particle size distribution includes the particle diameters of secondary particles taken into account as well. The particle diameter of each of the carbon particle (B) comprising a graphite material, the carbon particle (B) comprising a graphite particle and a carbonaceous layer, the carbon particle (B) comprising a carbon-coated graphite particle to which a carbon fiber is bound, and the carbon particle (B) comprising a carbonaceous material with its crystal underdeveloped, all of which are to be explained below, is preferably within the range of the particle diameter described above.

[Carbon Particles (B) Comprising Graphite Material]

The carbon particles (B) according to one embodiment are graphite particles, preferably artificial graphite particles. The graphite particles have a $d_{002}$ of preferably 0.337 nm or less, more preferably 0.336 nm or less. Further, the graphite particles have a $L_c$ of preferably 50 nm or more, more preferably 50 nm to 100 nm. The $d_{002}$ refers to the value of the interplanar spacing determined from a 002 diffraction peak measured by powder X-ray diffraction, and the $L_C$ refers to the size of crystallite in the c axis direction determined from a 002 diffraction peak measured by powder X-ray diffraction.

A preferable graphite particle has a BET specific surface area of preferably 1 to 10 m²/g, more preferably 1 to 7 m²/g. For artificial graphite particles, a coal-derived coke and/or a petroleum-derived coke can be used as a raw material.

Artificial graphite particles are preferably those obtained by heat-treating a coal-derived coke and/or a petroleum-derived coke at a temperature of preferably 2000° C. or more, more preferably 2500° C. or more. There is no particular limitation for the upper limit of the heat treatment temperature, but it is preferably 3200° C. This heat treatment is preferably performed under an inert atmosphere. In the heat treatment, a traditional Acheson graphitization furnace or the like can be used.

[Carbon Particles (B) Comprising Graphite Particles and Carbonaceous Layers]

The carbon particles (B) according to one embodiment are those comprising graphite particles and carbonaceous layers being on the surfaces the graphite particles (hereinafter may also be referred to as carbon coated graphite particles).

The graphite particles are those prepared by heat-treating a petroleum-derived coke and/or a coal-derived coke at a temperature of preferably 2000° C. or more, more preferably 2500° C. or more. Further, the graphite particles preferably have properties of the aforementioned carbon particles (B) comprising a graphite material.

The carbonaceous layer on the surface has a ratio of the intensity ($I_D$) of the peak in the range from 1300 to 1400 cm$^{-1}$ attributable to amorphous components to the intensity ($I_G$) of the peak in the range from 1580 to 1620 cm$^{-1}$ attributable to graphite components as measured by Raman spectroscopy, $I_D/I_G$ (R value), of preferably 0.1 or higher, more preferably 0.2 or higher, further preferably 0.4 or higher, and particularly preferably 0.6 or higher. When a carbonaceous lay er has a high R value, in other words, when a layer of an amorphous carbon material is placed on the surface of the graphite particle, intercalation and deintercalation of lithium ions are facilitated and the resulting lithium-ion battery is improved in its rapid charge-discharge characteristics.

The Carbon coated graphite particles can be manufactured in accordance with a known method. For example, a graphite powder is first pulverized to obtain fine graphite particles having a predetermined size. Then, the above graphite particles are stirred while an organic compound is sprayed thereto. Alternatively, an instrument such as a hybridizer manufactured by Nara Machinery Co., Ltd. is used to mix the graphite particle and an organic compound such as pitch, phenolic resins or the like so as to allow the mechanochemical treatment to proceed.

The organic compound is not particularly limited and is preferably isotropic pitch, anisotropic pitch, or a resin or a resin precursor or a monomer. When a resin precursor or a monomer is used, the resin precursor or the monomer is preferably polymerized into a resin. Preferable examples of the organic compound include at least one selected from the group consisting of petroleum pitch, coal pitch, phenolic resins, polyvinyl alcohol resins, furan resins, cellulose resins, polystyrene resins, polyimide resins, and epoxy resins. The amount of the organic compound to be attached can be selected so as to control the amount of the carbonaceous layer on the surface of the graphite particle. The amount of the organic compound to be attached is preferably 0.05 to 10 parts by mass and more preferably 0.1 to 10 parts by mass relative to 100 parts by mass of the graphite particle. When the amount of the carbonaceous layer is too great, the capacity potentially decreases.

Subsequently, graphite particles to which an organic compound is attached are heat-treated at preferably not less than 200° C. and not more than 2000° C., more preferably not less than 500° C. not more than 1500° C., even more preferably not less than 900° C. not more than 1200° C. Carbon coated graphite particles are obtained by this heat treatment. In a case where the heat treatment temperature is too low, the carbonization of the organic compound may not fully be completed, and hydrogen and oxygen may remain in the carbon particles (B), which may adversely affect the battery properties. In contrast, in a case where the heat treatment temperature is too high, there is a possibility that crystallization may be excessively promoted to deteriorate charge characteristics. The heat treatment is preferably performed under a non-oxidizing atmosphere. Examples of the non-oxidizing atmosphere include an atmosphere filled with an inert gas such as argon gas, nitrogen gas or the like, or a vacuum state. The carbon coated graphite particles may be fused each other to form a lump by heat treatment. Therefore, the carbon coated graphite particles are preferably crushed into a particle diameter described above in order to use them as an electrode active material. Further, the BET specific surface area of the carbon coated graphite particles is preferably 0.5 to 30 m$^2$/g, more preferably 0.5 to 10 m$^2$/g, even more preferably 0.5 to 5 m$^2$/g.

[Carbon Particles (B) Comprising Graphite Particles to which Carbon Fibers were Bound]

In the carbon particles (B) according to one embodiment, carbon fibers are bound to the surfaces of the aforementioned graphite particles or carbon coated graphite particles. As the carbon fibers, vapor-grown carbon fibers are preferred.

Carbon fibers to be used have a mean fiber diameter of preferably 10 to 500 nm, more preferably 50 to 300 nm, even more preferably 70 to 200 nm, in particular preferably 100 to 180 nm. In a case where the mean fiber diameter is too small, handling properties tend to deteriorate.

There is no particular limitation for the aspect ratio of the carbon fibers, but it is preferably 5 to 1000, more preferably 5 to 500, even more preferably 5 to 300, in particular preferably 5 to 200. In a case where the aspect ratio is 5 or more, they serve as a fibrous electrically conductive material. In a case where the aspect ratio is 1000 or less, handling properties are good.

Vapor-grown carbon fibers can be manufactured, for example, by introducing a carbon source such as benzene as a raw material into a high temperature reaction furnace using a carrier gas along with a catalyst comprising an organic transition metal compound such as ferrocene to perform gas phase pyrolysis. As method for producing vapor-grown carbon fibers, mentioned are, for instance, a method comprising producing pyrolytic carbon fibers on a substrate (JP S60-27700 A), a method comprising producing pyrolytic carbon fibers at a floating state (JP S60-54998 A), a method comprising producing pyrolytic carbon fibers on a wall of a reaction furnace (JP 2778434 B) or the like. Vapor-grown carbon fibers used in the present invention can be manufactured by these methods.

The vapor-grown carbon fibers manufactured in this way can be directly used as a raw material for the carbon particles (B). However, in a state as it is after vapor grown, pyrolysates of the carbon source as a raw material may be attached to the surfaces, and the crystal structure of the carbon fibers may be underdeveloped. Therefore, in order to remove impurities such as pyrolysates, and in order to develop a crystal structure, heat treatment can be performed under an inert gas atmosphere. In order to treat impurities such as pyrolysates, heat treatment is preferably performed at about 800 to 1500° C. under an inert gas such as argon. Further, in order to develop a crystal structure, heat treatment is preferably performed at about 2000 to 3000° C. under an inert gas such as argon. In doing so, a boron compound such as boron carbide ($B_4C$), boron oxide ($B_2O_3$), elementary boron, boric acid ($H_3BO_3$), borate or the like may be mixed as a graphitizing catalyst with vapor-grown carbon fibers. The addition amount of a boron compound can not generally be specified since it is dependent on chemical properties or physical properties of the boron compound to be used. For example, in a case where boron carbide ($B_4C$) is used, the amount thereof may be within the range of 0.05 to 10% by mass, preferably within the range of 0.1 to 5% by mass relative to the amount of the vapor grown carbon fibers. As vapor-grown carbon fibers treated in this way, for example, a commercially available product such as "VGCF" (registered trademark; Showa Denko K.K.) can be used.

There is no particular limitation for the method of binding (bonding) carbon fibers to the surface of a graphite particle or a carbon coated graphite particle. For example, carbon fibers can be bound to a carbonaceous layer in the formation process of the carbonaceous layer by mixing the carbon fibers with an organic compound, allowing the mixture to be attached to the graphite particle or the carbon coated graphite particle, and then performing heat treatment. The amount of carbon fibers is preferably 0.1 to 20 parts by mass, more preferably 0.1 to 15 parts by mass relative to 100 parts by mass of graphite particles. When 0.1 part by mass or more is used, the surface of a graphite particle can be widely covered. Since a carbonaceous layer having electric conductivity connects a graphite particle and carbon fibers, contact resistance is small. When the carbon particles (B) comprising graphite particles to which carbon fibers were bound are used, the effect for improving battery characteristic is larger than a case where carbon fibers are simply added to an electrode.

(Carbon Particles (B) Comprising a Poorly Crystalline Carbonaceous Material)

The carbon particles (B) according to one embodiment comprise a poorly crystalline carbonaceous material.

The poorly crystalline carbonaceous material as used herein refers to graphitizable carbon, non-graphitizable carbon, glassy carbon, amorphous carbon, low-temperature calcined carbon or the like. These poorly crystalline carbonaceous materials can be prepared in accordance with a known method.

As a raw material to prepare the carbonaceous material with its crystal underdeveloped, a petroleum-derived substance such as thermal heavy oil, pyrolytic oil, straight asphalt, blown asphalt, raw coke, needle coke, calcined coke, and tar and pitch as by-products from ethylene production; a coal-derived substance such as coal tar produced in coal carbonization, a heavy component obtained by distilling low-boiling-point components off coal tar, coal tar pitch, raw coke, needle coke, or calcined coke; a substance derived from resin such as phenolic resins, polyvinyl alcohol resins, furan resins, cellulose resins, polystyrene resins, polyimide resins, and epoxy resins; or a substance derived from plant such as a coconut shell, a rice husk, a coffee husk, bamboo charcoal, broad leaf trees, and needle leaf trees can be used.

The method for producing an poorly crystalline carbonaceous material shall not be limited to one. Examples of preferred manufacturing methods include a method comprising carbonizing the above raw material under an inert atmosphere at preferably not less than 800° C. not more than 1500° C., more preferably not less than 1000° C. not more than 1500° C.

The poorly crystalline carbonaceous material has a $d_{002}$ of preferably 0.400 nm or less, more preferably 0.385 nm or less, even more preferably 0.370 nm or less. The lower limit of $d_{002}$ is preferably 0.340 nm. Further, the poorly crystalline carbonaceous material preferably has a $L_C$ of 50 nm or less.

The poorly crystalline carbonaceous material has a BET specific surface area of preferably 1 to 10 $m^2/g$, more preferably 1 to 7 $m^2/g$.

[Carbon Precursor]

There is no particular limitation for the carbon precursor as long as a carbon layer can be formed. Examples thereof include a pitch, a resin, a resin precursor (monomer), saccharides, aromatic hydrocarbon and the like. As a pitch or resin, preferred is at least one selected from the group consisting of a petroleum-derived pitch, a coal-derived pitch, a phenol resin, a polyvinyl alcohol resin, a furan resin, a cellulose resin, a polystyrene resin, a polyimide resin and an epoxy resin. Further, as saccharides, any of monosaccharides, disaccharides and polysaccharide can be used. Among saccharides, preferred is at least one selected from the group consisting of glucose, fructose, galactose, sucrose, maltose, lactose, starch, cellulose and glycogen. Moreover, as aromatic hydrocarbons, mentioned are benzene, toluene, xylene, ethylbenzene, styrene, cumene, naphthalene, anthracene and the like. Among these, saccharides are preferred. As saccharides, preferred is at least one selected from the group consisting of glucose, fructose, galactose, sucrose, maltose, lactose, starch, cellulose and glycogen.

The amount of a carbon layer can be adjusted by the amount of a carbon precursor to be used. The amount of a carbon precursor is preferably 0.05 to 50 parts by mass, more preferably 0.1 to 30 parts by mass, even more preferably 1 to 25 parts by mass relative to total 100 parts by mass of the particles (A) and the carbon particles (B). Note that the amount of a carbon precursor is approximately the same as the amount of a carbon layer.

In a case where a molecular of a carbon precursor has many hydroxyl groups, dehydration may suddenly occur in a specific temperature zone during heating and calcining. Depending on heating conditions, a foamed calcined product like a pancake resulted from foaming of steam may be produced. For example, sucrose (sugar), which suddenly undergoes three-step dehydration reactions in a range of 220° C. to 400° C., is susceptible to foam production, and the denseness of a carbon layer tends to be lost. By adding carboxylic acid and then heating in order to suppress such a phenomenon, foaming under calcination temperature can be suppressed. For example, by heating with acetic acid, a dehydration reaction occurs at or below a temperature of the boiling point of acetic acid (110° C.), and forming can be suppressed even under a calcination temperature. In this case, it is also preferred because acetic acid will not remain.

Further, in a case where a weakly acidic carboxylic acid having a long alkyl group is used, a carbon precursor can uniformly adhere to a hydrophobic graphite surface at the vicinity of the graphite through the long alkyl group, and as a result, a dehydration reactant can be more uniformly formed on the graphite surface. Furthermore, a calcined product can be formed on a graphite surface more uniformly and densely.

[Carboxylic Acid Compound]

Examples of carboxylic acid compounds include, in terms of a basic skeleton, saturated fatty acid, unsaturated fatty acid, aromatic carboxylic acid, alicyclic carboxylic acid and the like. A carboxylic acid compound may be monocarboxylic acid having one carboxyl group, or may be polyvalent carboxylic acid having two or more carboxyl groups such as dicarboxylic acid and tricarboxylic acid, for example. Further, a carboxylic acid compound may have a group other than a carboxyl group. Examples thereof include hydroxycarboxylic acid, alkoxycarboxylic acid, oxocarboxylic acid, aminocarboxylic acid, halogenated carboxylic acid and the like. Further, as carboxylic acid compounds, included are carboxylic acid anhydride, carboxylic acid salt, carboxylic acid ester and the like. Among these, saturated fatty acid is preferred. Examples of saturated fatty acids include formic acid, acetic acid, propionic acid, butyric acid, valeric acid and caproic acid. Among these, formic acid, acetic acid, propionic acid or butyric acid is preferred.

The amount of a carboxylic acid compound is preferably 10 to 100 parts by mass, more preferably 20 to 60 parts by mass relative to 100 parts by mass of the particles (A).

For a liquid medium, those in which a carbon precursor and a carboxylic acid compound can be dissolved are preferred. They include, for example, a nonpolar solvent such as hexane, benzene, toluene, diethyl ether, chloroform, ethyl acetate, methylene chloride or the like; a polar aprotic solvent such as tetrahydrofuran, acetone, acetonitrile, N,N-dimethylformamide, dimethyl sulfoxide, quinoline, pyridine or the like; a polar protic solvent such as formic acid, acetic acid, 1-butanol, 2-propanol, 1-propanol, ethanol, methanol, water or the like. Among these, a polar solvent is preferred. Carboxylic acid as a polar protic solvent can serve as both a carboxylic acid compound and a liquid medium described above.

A slurry is manufactured by mixing the carbon particles (B), the particles (A), a carbon precursor, a carboxylic acid compound and a liquid medium. Mixing can be performed using a known mixer or kneader. There is no particular limitation for the concentration of a slurry as long as the carbon particles (B) and the particles (A) are uniformly dispersed. However, in a case where the concentration of a slurry is too low, it will take a long time to allow drying and solidification.

Drying and solidification will not be particularly limited by a means therefor, and can be performed by a means such as natural drying, hot-air drying, vacuum drying or the like.

Subsequently, the solidified material is heat-treated. A temperature at the heat treatment is preferably not less than 200° C. and not more than 2000° C., more preferably not less than 500° C. and not more than 1500° C. In a case where the heat treatment temperature is too low, the carbonization of an organic compound may not fully be completed, and hydrogen and oxygen may remain in the carbon particles (B), which may cause negative effects on battery characteristics. In contrast, in a case where the heat treatment temperature is too high, crystallization may be excessively promoted to deteriorate charge characteristics, and the particles (A) may bind to carbon to become inert against Li ions and become incapable of contributing to charge and discharge. The heat treatment is preferably performed under a non-oxidizing atmosphere. Examples of non-oxidizing atmospheres include an atmosphere where an inert gas such as argon gas and nitrogen gas is filled. A carbon precursor is carbonized by this heat treatment to form carbon layers which cover the carbon particles (B). Further, the particles (A) are enclosed in the carbon layers, and the particles (A) are fixed at the surfaces of the carbon particles (B) through the carbon layers to obtain composite particles. By this heat treatment, the composite particles may be fused each other to form a mass. Therefore, in order to use the composite particles as an electrode active material, the 50% particle diameter ($D_{50}$) in a volumetric accumulative particle size distribution is adjusted by crushing to 2 to 40 μm, more preferably 2 to 15 μm, even more preferably 3 to 10 μm, most preferably 4 to 8 μm.

Figure 1:
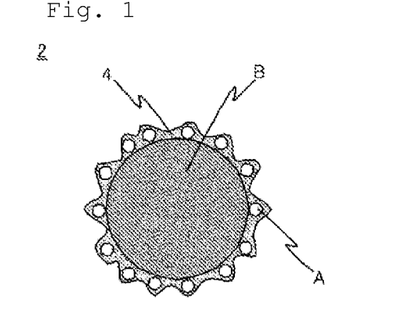
FIG. 1 shows a structural concept of a negative electrode material obtained by the manufacturing method according to one embodiment of the present invention.

In this way, a negative electrode material 2 as shown in FIG. 1 comprising the carbon particle (B), a carbon layer 4 covering the surface of the carbon particle (B) and the particles (A) containing an element capable of occluding and releasing lithium ions which are enclosed in the carbon layer 4 can be obtained.

In the negative electrode material according to the present invention, the particles (A) are uniformly spread and adhered to the carbon particle (B), and therefore agglomerates of the particles (A) alone are not substantially contained. That state can be identified by SEM-EDX observation. That is, SEM-EDX observation shows that the negative electrode material according to the present invention has a very small proportion of the particles (A) present at a place where the carbon particles (B) are not present relative to the total particles (A).

(Negative Electrode Sheet)

The negative electrode sheet according to one embodiment of the present invention has a current collector and an electrode layer covering the current collector.

Examples of current collectors include a nickel foil, a copper foil, a nickel mesh, a copper mesh or the like.

The electrode layer comprises the above negative electrode material, a binder and an electrically conductive assistant.

Binders include, for example, polyethylene, polypropylene, ethylene-propylene terpolymer, butadiene rubber, styrene-butadiene rubber, butyl rubber, acrylic rubber, a high molecular weight compound with large ionic conductivity and the like. Examples of high molecular weight compounds with large ionic conductivity include polyvinylidene fluoride, polyethylene oxide, polyepichlorohydrin, polyphosphazene, polyacrylonitrile or the like. The amount of the binder is preferably 0.5 to 100 parts by mass relative to 100 parts by mass of the negative electrode material.

There is no particular limitation for the electrically conductive assistant as long as it can serve to impart electric conductivity and electrode stability (buffering effects for the volume change upon intercalation and deintercalation of lithium ions) on an electrode. Examples thereof include vapor-grown carbon fiber (for example, "VGCF" from Showa Denko K.K.), electrically conductive carbon (for example, "Denka Black" from Denki Kagaku Kogyo K.K. "Super C65" from TIMCAL Graphite & Carbon, "Super C45" from TIMCAL Graphite & Carbon, "KS6L" from TIMCAL Graphite & Carbon) and the like. The amount of an electrically conductive assistant is preferably 10 to 100 parts by mass relative to 100 parts by mass of a negative electrode material.

An electrode layer can be obtained by, for example, applying and drying a paste comprising the binder, the negative electrode material and the electrically conductive assistant. The paste can be obtained, for example, by at least kneading the negative electrode material, the binder, the electrically conductive assistant and if desired a solvent. The paste can be fabricated into a form such as a sheet-like form and a pellet-like form.

There is no particular limitation for the solvent, and examples of the solvent include N-methyl-2-pyrrolidone, dimethylformamide, isopropanol, water or the like. In the case of a binder for which water is used as a solvent, a thickening agent is preferably used in combination. The amount of a solvent is adjusted so that a paste has a viscosity at which application to a current collector is easily performed.

There is no particular limitation for the method of applying a paste. The thickness of an electrode layer is usually 50 to 200 μm. In a case where the thickness of an electrode layer is too large, a negative electrode sheet may not be accommodated in a standardized battery housing. The thickness of an electrode layer can be adjusted by the application amount of a paste. It can also be adjusted by performing pressure forming after drying a paste. Methods of pressure forming include those such as roll pressing, plate pressing or the like. A pressure when performing a pressure forming is preferably about 100 MPa to about 300 MPa (about 1 to 3 ton/cm$^2$).

(Lithium Ion Battery)

The lithium ion battery according to one embodiment of the present invention comprises a positive electrode sheet, the negative electrode sheet, and at least one selected from the group consisting of a nonaqueous electrolytic solution and a nonaqueous polymer electrolyte.

For a positive electrode sheet used in the present invention, those traditionally used for lithium ion batteries, and specifically, a sheet comprising a positive electrode active material can be used. Examples of positive electrode active materials include $LiNiO_2$, $LiCoO_2$, $LiMn_2O_4$, $LiNi_{0.34}Mn_{0.33}Co_{0.33}O_2$, $LiFePO_4$ and the like.

There is no particular limitation for the nonaqueous electrolytic solution and nonaqueous polymer electrolyte used for lithium ion batteries. Examples include an organic electrolytic solution in which a lithium salt such as $LiClO_4$, $LiPF_6$, $LiAsF_6$, $LiBF_4$, $LiSO_3CF_3$, $CH_3SO_3Li$, $CF_3SO_3Li$ or the like is dissolved in a nonaqueous solvent such as ethylene carbonate, diethyl carbonate, dimethyl carbonate, ethyl methyl carbonate, propylene carbonate, butylene carbonate, acetonitrile, propionitrile, dimethoxyethane, tetrahydrofuran, γ-butyrolactone or the like; a gel-like polymer electrolyte containing polyethylene oxide, polyacrylonitrile, polyvinylidene fluoride, polymethyl methacrylate or the like; and a solid-like polymer electrolyte containing a polymer having a ethylene oxide bond or the like.

Moreover, a small amount of a material which undergoes a decomposition reaction when a lithium ion battery is charged for the first time may be added to the electrolytic solution. The above materials include, for example, vinylene carbonate (VC), biphenyl, propane sultone (PS), fluoroethylene carbonate (FEC), ethylene sultone (ES) or the like. The addition amount thereof is preferably 0.01 to 30% by mass.

A separator can be placed between the positive electrode sheet and the negative electrode sheet in the lithium ion battery according to the present invention. Examples of Separators include a non-woven fabric, a cloth, or a microporous film, or combinations thereof or the like comprising polyolefine such as polyethylene, polypropylene or the like as a main component.

EXAMPLES

Below, the present invention will be described in detail with reference to Examples, but the present invention shall not be limited to these Examples.

In the present Examples, various physical properties were measured by the following methods.

(Particle Diameter)

Two microspatula of a powder and two drops of a nonionic surfactant (Triton X; Roche Applied Science) were added to 50 ml of water, and ultrasonic dispersion was performed for 3 minutes. This dispersion liquid was introduced into a laser diffraction particle size distribution measurement device (LMS-2000e) from Seishin Enterprise Co., Ltd. to measure a volumetric accumulative particle size distribution.

(Raman R Value)

Using a JASCO laser Raman spectroscopic measuring apparatus (NRS-3100), measurements were performed under the conditions: an excitation wavelength of 532 nm, an entrance slit width of 200 μm, an exposure time of 15 seconds, 2 times of integration and a diffraction grating of 600 lines/mm. The ratio ($I_D/I_G$) of the intensity $I_D$ of a peak around 1360 cm$^{-1}$ (from a amorphous component) and the intensity $I_G$ of a peak around 1580 cm$^{-1}$ (from a graphite component) was computed from the measured spectrum. It was taken as a R value to give a measure of the degree of graphitization.

($d_{002}$, $L_C$)

The interplanar spacing $d_{002}$ and the dimension in the c axis direction of a crystallite $L_C$ were obtained from the 002 diffraction line in powder X ray diffraction.

(SEM (Scanning Electron Microscopy) Observation)

Using a JEOL Quick Auto Coater, the surface of a sample was sputtered with platinum at a PRESET of 20. Then, using a JEOL FE-SEM (JSM-7600F), SEM observation of a powder surface was performed with the column mode set to SEI (accelerating voltage: 5.0 kV). In SEM-EDX measurements, the column mode was set to SEI (accelerating voltage: 15.0 kV), and elemental mapping was performed at a resolution where a distribution can be resolved.

(Manufacture of Negative Electrode Sheet)

As a binder, polyacrylic acid (PAA, molecular weight: 1800) and carboxymethylcellulose (CMC) were prepared. A white powder of PAA was dissolved in purified water to obtain a PAA solution. Further, a white powder of CMC was mixed with purified water, and stirred with a stirrer for one whole day and night to obtain a CMC aqueous solution which had absorbed water to swell.

Carbon Black (SUPER C45; TIMCAL Graphite & Carbon) and vapor-growth carbon fiber (VGCF-H, Showa Denko K.K.) were mixed by a mass ratio of 3:2 to obtain an electrically conductive assistant.

Mixed were 90 parts by mass of a negative electrode material, 5 parts by mass of the electrically conductive assistant, 2.5 parts by mass of the CMC aqueous solution and 2.5 parts by mass of the PAA solution, to which a proper amount of water was added to adjust viscosity, and kneaded with a planetary centrifugal mixer (Thinky Corporation) to obtain a paste for negative electrodes.

The paste for negative electrodes was applied on a copper foil so that the thickness of a negative electrode layer was 150 μm, and then vacuum dried. From the resulting sheet, a sheet piece with a diameter of 16 mm was punched out. The sheet piece was vacuum dried at 50° C. for 12 hours to obtain a negative electrode sheet.

(Production of Battery for Evaluation)

The following operations were performed inside a glove box in which a dry argon gas atmosphere with a dew point of −80° C. or less was maintained.

2320-type coin cells (diameter: 23 mm, thickness: 20 mm) were prepared. A foil piece with a diameter of 17.5 mm was punched out from a 1-mm thick lithium foil, and this was taken as a positive electrode sheet. The positive electrode sheet was placed into a coin cell cap. Then, an electrolytic solution was injected into the coin cell. Then, a separator and a negative electrode sheet were placed in this order, and the coin cell casing and the coin cell cap were hermetically crimped to obtain a lithium ion battery for evaluation. Note that the electrolytic solution was a liquid obtained by mixing 1% by mass of fluoroethylene carbonate (FEC) with a solvent in which ethylene carbonate, ethylmethyl carbonate and diethyl carbonate were mixed in a ratio of 3:5:2 by volume, and dissolving an electrolyte $LiPF_6$ therein at a concentration of 1 mol/L.

(Charge and Discharge Test)

Constant current charge was performed on a lithium ion battery for evaluation from the rest potential to 25 mV at 0.373 mA/cm². Then, constant current discharge was performed at 0.373 mA/cm², and cut off at 1.5 V. This charge and discharge operation was considered as 1 cycle, and 20 cycles were performed.

Example 1

Si particles (primary particle diameter: 100 nm) were prepared. This was considered as the particles (A–1).
A petroleum-derived coke was pulverized into a mean particle diameter of 5 μm. This was heat-treated in an Acheson furnace at 3000° C. to obtain graphite particles having a BET specific surface area of 3.2 m²/g, a $d_{002}$ of 0.3363 nm, a $L_C$ of 61 nm, a 10% particle diameter (D10) of 2.5 μm, a 50% particle diameter (D50) of 5.1 μm, a 90% particle diameter (D90) of 12.3 μm and $I_D/I_G$ (R value) of 0.06. This was considered as the carbon particles (B-1).
Sucrose ($C_{12}H_{22}O_{11}$) was dissolved in purified water to prepare a sucrose aqueous solution.
The carbon particles (B-1) 18 g and the particles (A-1) 2 g were added to isopropyl alcohol and mixed. To this mixture, added was the sucrose aqueous solution in an amount of 10% by mass in the ratio of sucrose to a negative electrode material. To this, 0.7 g of acetic acid was further added and mixed to obtain a slurry. The carbon particles (B-1) and the particles (A-1) were uniformly dispersed in the slurry, and floating-up and separation of the particles (A-1) alone did not occur.
The resulting slurry was spread over a stainless steel tray for drying at ordinary temperature followed by vacuum drying at 70° C. to remove water. Then, it was placed into a calcination furnace, and heat treatment was performed for 1 hour at 600° C. under a nitrogen gas flow to carbonize the sucrose. It was then taken out of the calcination furnace, and pulverized and sieved to obtain a carbon-coated negative electrode material. According to observation by SEM-EDX, the particles (A) were almost always present at a place where the carbon particles (B) were present while the particles (A) are hardly present at a place where the carbon particles (B) were not present. A lithium ion battery for evaluation was produced with this negative electrode material, and charge and discharge properties were measured. The results are shown in Table 1.

Example 2

A carbon coated negative electrode material was obtained in the same manner as in Example 1 except that the temperature at the heat treatment was changed to 700° C. According to observation by SEM-EDX, the particles (A) were almost always present at a place where the carbon particles (B) were present while the particles (A) were hardly present at a place where the carbon particles (B) were not present.
A lithium ion battery for evaluation was produced with this negative electrode material, and charge and discharge properties were measured. The results are shown in Table 1 and FIG. 2.

Example 3

A carbon coated negative electrode material was obtained in the same manner as in Example 1 except that the temperature at the heat treatment was changed to 800° C. According to observation by SEM-EDX, the particles (A) were almost always present at a place where the carbon particles (B) were present while the particles (A) were hardly present at a place where the carbon particles (B) were not present.
A lithium ion battery for evaluation was produced with this negative electrode material, and charge and discharge properties were measured. the results are shown in Table 1.

Examples 4 to 6

A carbon coated negative electrode material was obtained in the same manner as in Examples 1 to 3 except that the amount of sucrose relative to the negative electrode material was changed to 20% by mass and the amount of acetic acid was changed to 1.2 g.
The carbon particles (B) and the particles (A) were uniformly dispersed in the slurries prepared in Examples 4 to 6, and floating-up and separation of Si particles alone did not occur.
According to observation by SEM-EDX, in any of the negative electrode materials obtained in Examples 4 to 6, the particles (A) were almost always present at a place where the carbon particles (B) were present while the particles (A) were virtually not present at a place where the carbon particles (B) were not present.
Lithium ion batteries for evaluation were produced with the negative electrode materials obtained in Examples 4 to 6, and charge and discharge properties were measured. The results are shown in Table 1.

Comparative Example 1

A carbon coated negative electrode material was obtained in the same manner as in Example 2 except that water was added instead of acetic acid. In the slurry, some of Si particles floated up on the surface and were separated. It was frequently observed by SEM-EDX that the particles (A) were not present at a place where the carbon particles (B) were present, and that the particles (A) were present at a place where the carbon particles (B) were not present. A lithium ion battery for evaluation was not produced since some of Si particles were separated.

TABLE 1

|  | Acetic acid | Amount of sucrose ≈ Amount of carbon layer | Heat treatment temperature ° C. | Initial discharge capacity mAh/g | Initial efficiency | 20-cycle capacity retention ratio |
| --- | --- | --- | --- | --- | --- | --- |
| Ex. 1 | yes | 10% | 600 | 442 | 79% | >100% |
| Ex. 2 | yes |  | 700 | 449 | 81% | 98% |
| Ex. 3 | yes |  | 800 | 450 | 82% | >100% |
| Ex. 4 | yes | 20% | 600 | 400 | 68% | 98% |
| Ex. 6 | yes |  | 700 | 402 | 71% | >100% |
| Ex. 6 | yes |  | 800 | 380 | 73% | >100% |

Figure 2:
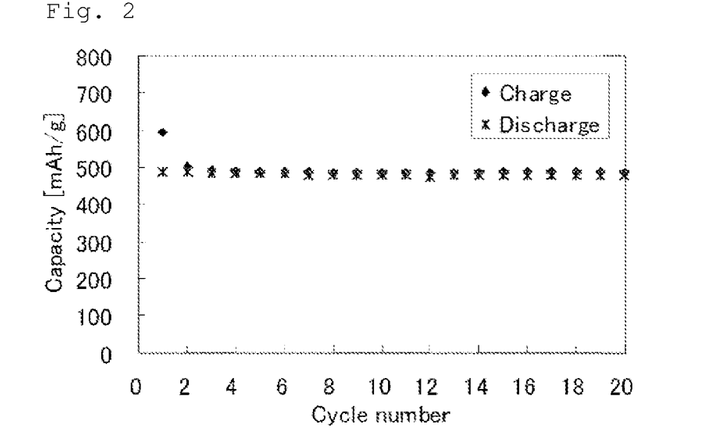
FIG. 2 shows the cycle characteristics of a negative electrode material obtained by the method in Example 2.
Figure 3:
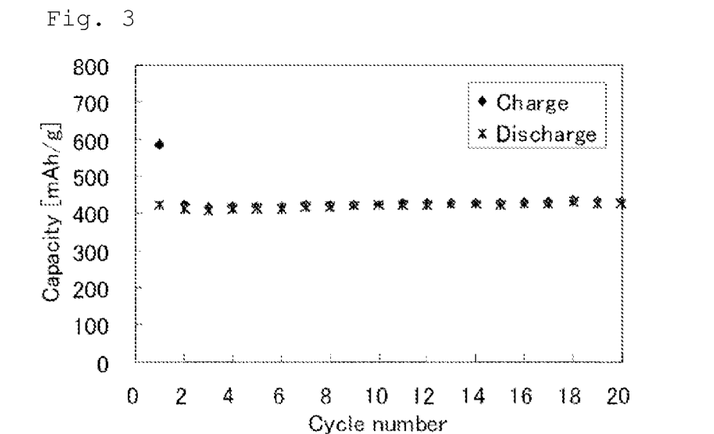
FIG. 3 shows the cycle characteristics of a negative electrode material obtained by the method in Example 5.

As shown in Table 1, the lithium ion batteries in which the negative electrode materials obtained by the methods in Examples were used show a high capacity retention ratio. A capacity usually decreases as charge and discharge are repeated. In contrast, in the case of the carbon coated negative electrode materials, the capacity did not substantially change at the initial cycle through the 20th cycle as shown in FIGS. 2 and 3. Further, in a case where the temperature at the heat treatment is high, both the discharge capacity and the initial efficiency tend to be high. In a case where the amount of carbon coating is small, both the discharge capacity and the initial efficiency also tend to be high.

The invention claimed is:

1. A method for producing a negative electrode material for lithium ion batteries, the method comprising:
    mixing carbon particles (B), particles (A) comprising an element capable of occluding and releasing lithium ions, a carbon precursor, a carboxylic acid compound and a liquid medium to prepare a slurry;
    drying and solidifying the slurry; and
    heat-treating the resulting solidified material to carbonize the carbon precursor.

2. The method for producing a negative electrode material for lithium ion batteries according to claim 1, wherein the liquid medium is a polar solvent.

3. The method for producing a negative electrode material for lithium ion batteries according to claim 1, wherein the carboxylic acid compound is at least one selected from the group consisting of aliphatic carboxylic acid, aromatic carboxylic acid, hydroxycarboxylic acid, oxocarboxylic acid, polyvalent carboxylic acid, carboxylic acid anhydride and carboxylate.

4. The method for producing a negative electrode material for lithium ion batteries according to claim 1, wherein the carboxylic acid compound is at least one selected from the group consisting of formic acid, acetic acid, propionic acid, butyric acid, valeric acid and caproic acid.

5. The method for producing a negative electrode material for lithium ion batteries according to claim 1, wherein a temperature during the heat treatment is not less than 200° C. and not more than 2000° C.

6. The method for producing a negative electrode material for lithium ion batteries according to claim 1, wherein the carbon precursor is a saccharide.

7. The method for producing a negative electrode material for lithium ion batteries according to claim 1, wherein the carbon precursor is at least one selected from the group consisting of glucose, fructose, galactose, sucrose, maltose, lactose, starch, cellulose and glycogen.

8. The method for producing a negative electrode material for lithium ion batteries according to claim 1, wherein the amount of the particles (A) is 1 to 100 parts by mass relative to 100 parts by mass of the carbon particles (B).

9. The method for producing a negative electrode material for lithium ion batteries according to claim 1, wherein the element capable of occluding and releasing lithium ions is at least one selected from the group consisting of Si, Sn, Ge, Al and In.

10. The method for producing a negative electrode material for lithium ion batteries according to claim 1, wherein the amount of the carbon precursor is 0.05 to 50 parts by mass relative to total 100 parts by mass of the particles (A) and the carbon particles (B).

11. The method for producing a negative electrode material for lithium ion batteries according to claim 1, wherein the carbon particles (B) are graphite particles prepared by heat-treating a petroleum-derived coke and/or a coal-derived coke at a temperature of 2000° C. or more.

12. The method for producing a negative electrode material for lithium ion batteries according to claim 1, wherein the carbon particles (B) are carbonaceous particles prepared by heat-treating a petroleum-derived coke and/or a coal-derived coke at a temperature of not less than 800° C. and less than 2000° C.

13. The method for producing a negative electrode material for lithium ion batteries according to claim 1, wherein the carbon particles (B) comprise graphite particles prepared by heat-treating a petroleum-derived coke and/or a coal-derived coke at a temperature of 2000° C. or more, and carbonaceous layers being 0.1 or more in the ratio $I_D/I_G$ (R value) of the intensity ($I_D$) of a peak present in a range between 1300 and 1400 $cm^{-1}$ and the intensity ($I_G$) of a peak present in a range between 1580 and 1620 $cm^{-1}$ as measured by Raman spectroscopy wherein the carbonaceous layers are on the surface of the graphite particles.

14. The method for producing a negative electrode material for lithium ion batteries according to claim 13, wherein the amount of the carbonaceous layers is 0.05 to 10 parts by mass relative to 100 parts by mass of the graphite particles.

* * * * *